March 8, 1966 D. P. DONCASTER ETAL 3,239,157

MAGNETIC TAPE MAGAZINE PLAYER APPARATUS

Original Filed May 18, 1959 3 Sheets-Sheet 1

INVENTORS
DANIEL P. DONCASTER
BENJAMIN B. BAUER
ABRAHAM A. GOLDBERG
BY
Carpenter, Abbott, Coulter & Kinney
THEIR ATTORNEYS March 8, 1966 D. P. DONCASTER ETAL 3,239,157

MAGNETIC TAPE MAGAZINE PLAYER APPARATUS

Original Filed May 18, 1959 3 Sheets-Sheet 2

INVENTORS
DANIEL P. DONCASTER
BENJAMIN B. BAUER
ABRAHAM A. GOLDBERG
BY
Carpenter, Abbott, Coulter & Kinney
THEIR ATTORNEYS March 8, 1966 D. P. DONCASTER ETAL 3,239,157

MAGNETIC TAPE MAGAZINE PLAYER APPARATUS

Original Filed May 18, 1959 3 Sheets-Sheet 3

INVENTORS
DANIEL P. DONCASTER
BENJAMIN B. BAUER
ABRAHAM A. GOLDBERG
BY

Carpenter Abbott Coulter & Kinney
THEIR ATTORNEYS 3,239,157

MAGNETIC TAPE MAGAZINE PLAYER APPARATUS

Daniel P. Doncaster, Rye, N.Y., and Benjamin B. Bauer and Abraham A. Goldberg, Stamford, Conn., assignors to Minnesota Mining & Manufacturing Company, St. Paul, Minn., a corporation of Delaware
Original application May 18, 1959, Ser. No. 814,025, now Patent No. 3,090,574, dated May 21, 1963. Divided and this application Mar. 27, 1963, Ser. No. 279,348
5 Claims. (Cl. 242—55.13)

This application is a division of co-pending application Serial No. 814,025, filed May 18, 1959, now Patent No. 3,090,574.

The present invention relates to magnetic tape recording and reproducing apparatus and more particularly to new and improved apparatus of this character which utilizes a cartridge for the magnetic tape and is semiautomatic in operation.

In the current commercial practice, magnetic tape is usually wound on a simple spool and conventional tape recording and reproducing apparatus includes means for transporting the tape past a recording or playback head and for rewinding the tape on the spool. The tape is usually required to be threaded manually through the tape transport path and its end is secured to a takeup spool on which the tape is wound during recording or playback operations. For this reason, and others, among them the fact that for any given playing time tape is more bulky than a disc record, magnetic tape recordings have not even begun to approach the popularity of disc records for which automatic record players have been available for many years.

In an effort to achieve automatic operation of tape recording and reproducing apparatus to a degree, it has been proposed to mount both a supply spool and a takeup spool in spaced apart relation, the tape being permanently threaded over suitable guide means and having its ends fixed to the two spools. However, such cartridges have not been satisfactory because they occupy more than twice the volume of the supply spool alone and a number of mechanical difficulties have been encountered in their use.

It is an object of the invention, accordingly, to provide new and improved magnetic tape recording and reproducing apparatus which is free from the above-noted deficiencies of the prior art.

Another object of the invention is to provide new and improved magnetic tape recording and reproducing apparatus which includes novel means for automatically leading the tape from its supply spool to a takeup spool.

A further object of the invention is to provide new and improved magnetic tape recording and reproducing apparatus of the above character which embodies semi-automatic rewind mechanism.

These and other objects of the invention are attained by providing a tape cartridge, as described in the above-mentioned Patent No. 3,090,574, comprising a tape spool rotatably mounted in an enclosure and having tape guide means defining a tape feed path and brake means for braking rotation of the spool. At the free end of the tape is a pull member which serves as a stop preventing the tape end from entering the cartridge and which is adapted to be engaged by automatic means to thread the tape on a takeup spool. The cartridge has portions adjacent the tape feed path that are shaped to accommodate magnetic recording and playback means and tape advancing means in proper operating position.

Advancement of the tape is effected by cooperating capstan and pressure roller means and manually operable means is provided for moving the capstan and pressure roller means out of the tape transport path as required for insertion and removal of the cartridge and during the rewind cycle. Manually operable means is also provided for coupling common motive means selectively to drive takeup spool means in the play or record position, or to the spool in the cartridge when in the rewind position. The takeup spool means embodies means to pick up the pull member on the free end of the tape in the cartridge and to guide it inwardly of the takeup spool to thread the tape thereon.

For a better understanding of the invention, reference is made to the following detailed description of a representative embodiment, taken in conjunction with the accompanying drawings in which.

Figure 1:
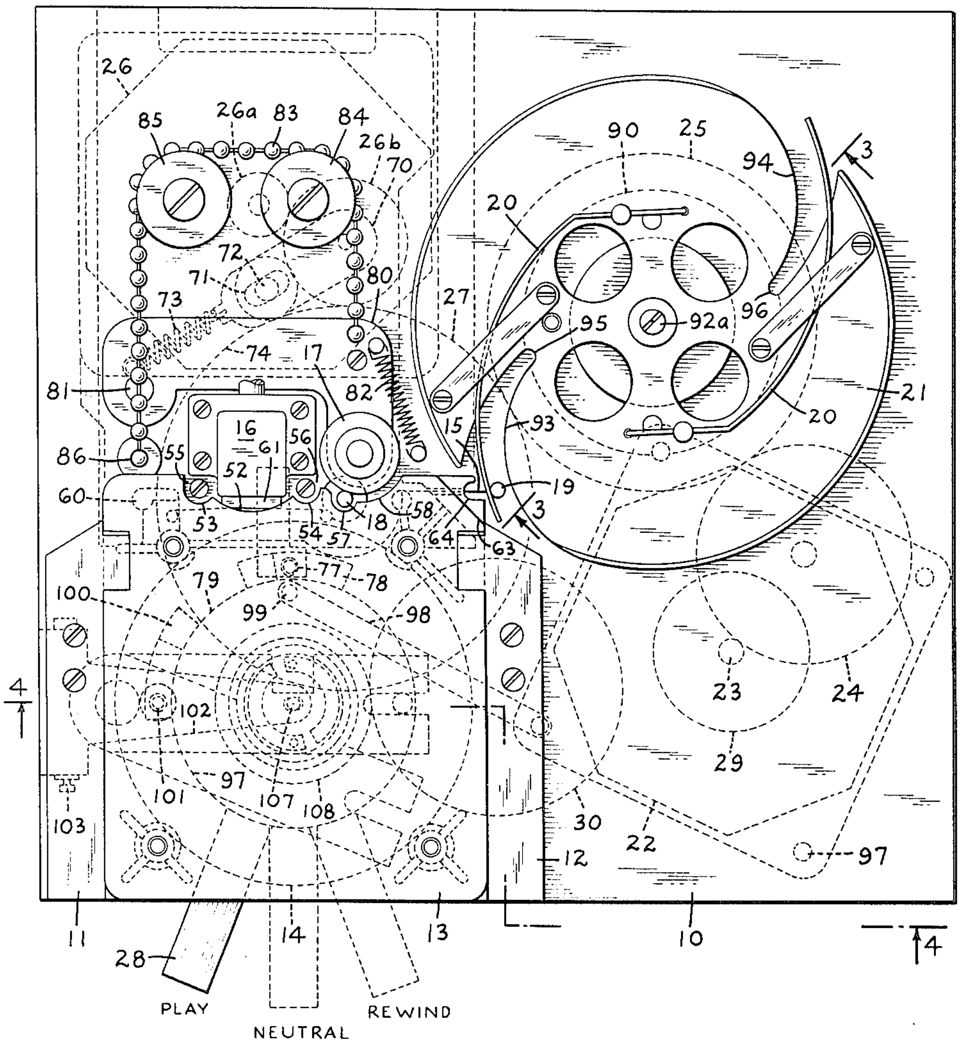
FIG. 1 is a plan view of tape recording and reproducing apparatus constructed according to the invention.

While apparatus according to the invention may be used either in recording or reproducing operations, it will be described herein for purposes of illustration in connection with the reproduction of signals from a prerecorded tape.

Briefly, magnetic tape recording and reproducing apparatus according to the invention comprises a deck 10 (FIG. 1) having spaced apart guides 11 and 12 thereon defining a space in which a magnetic tape cartridge 13 is adapted to be slidably received. The cartridge 13 includes a spool 14 on which a magnetic tape 15 is wound with the oxide surface facing outwardly. The tape is adapted to be transported past a conventional reproducing head 16 by tape transport mechanism comprising an engaged pressure roller 17 and a driven capstan 18.

Figure 4:
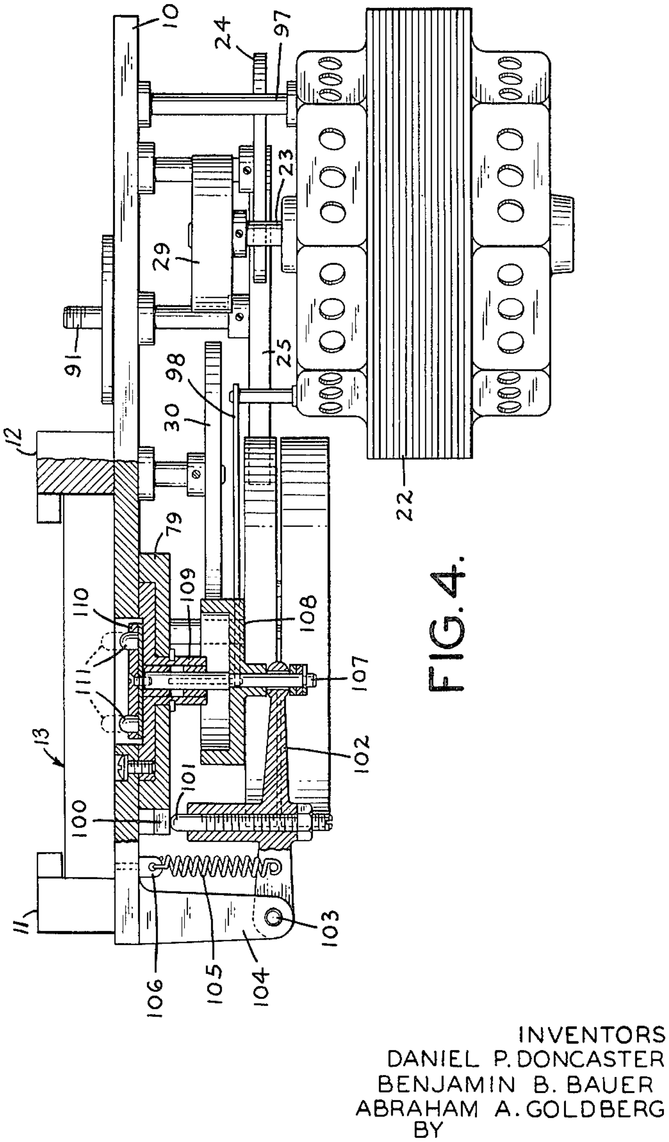
FIG. 4 is a view in section taken along the line 4—4 of FIG. 1 and looking in the direction of the arrows.

The tape has secured at its free end a pull member 19 which is adapted to be picked up automatically by spring hooks 20 formed on a takeup reel 21. During the playing cycle, the takeup reel 21 is adapted to be driven through a conventional slip clutch 25 (FIGS. 1 and 4) by a motor 22, the drive shaft 23 of which is brought into engagement with an idler roller 24 for this purpose.

Also, during the playing cycle, the capstan 18 is adapted to be driven by a motor 26 through a drive roller 26*a*, an idler roller 26*b* and a conventional flywheel 27 embodying a mechanical filter, as described in greater detail below.

The apparatus is controlled by means of a control bar 28 which may be moved selectively to either one of three positions as shown in FIG. 1. When moved to the center or "Neutral" position, the control bar 28 causes the capstan 18 to be lowered below the level of the tape transport path and the pressure roller 17 to be moved away so that a cartridge 13 may be removed or inserted. Also, in this position of the control bar 28, the drive shaft 23 on the takeup motor 22 is out of engagement with the idler 24 so that the takeup reel 21 is at rest.

When the control bar 28 is moved to the left or "Play" position shown in FIG. 1, the capstan 18 is raised to the normal playing position and is engaged by the pressure roller 17 as required for transport of the tape past the reproducing head 16. Also, at this time, the drive shaft 23 of the takeup motor 22 is in engagement with the idler 24 so that the takeup reel 21 is being driven at the proper speed to wind up the tape thereon after it has been played.

Movement of the control bar 28 to the right or "Rewind" position also causes the capstan 18 to drop below the level of the tape transport path and the pressure roller 17 to be moved away. In addition, the takeup motor 22 is moved to bring a drive roller 29 on the shaft 23 into engagement with a rewind idler 30 which drives the spool 14 in the cartridge 13 in the direction to rewind the tape by means to be described in greater detail hereinafter.

One end of the cartridge 13 is provided with a recessed portion 52 in which the reproducing head 16 (FIG. 1) is adapted to be received when the cartridge is in the playing position, as well as adjacent recesses 53 and 54 which are adapted to accommodate fixed guides 55 and 56 on opposite sides of the recording or reproducing head 16. Also, this end of the cartridge 13 is provided with additional recessed portions 57 and 58 which accommodate the capstan 18 and the pressure roller 17, respectively, when the cartridge is in the position shown in FIG. 1.

Wound on the spool 14 is the roll of magnetic tape 15, the free end of which passes over a guide 60 formed in the cartridge 13, over a felt pad 61 on a light phosphor spring **61*a* supported on members 61*b* and 61*c*, over the guides 60*a* and 60*b* and through a slot 62 formed adjacent one corner of the cartridge 13. This corner of the cartridge 13 is cut away on the bias at 63 and is provided with a recess 64 in which the pull member 19 secured to the end of the tape is adapted to be received. The tape 15 may be one-sixteenth of an inch wide and from one to one and a half mils thick, so that the cartridge 13** can be about three and a quarter inches on a side and about five-sixteenths of an inch deep for a roll having a playing time of about thirty minutes at a tape speed of one and seven-eighths inches per second.

Figure 2:
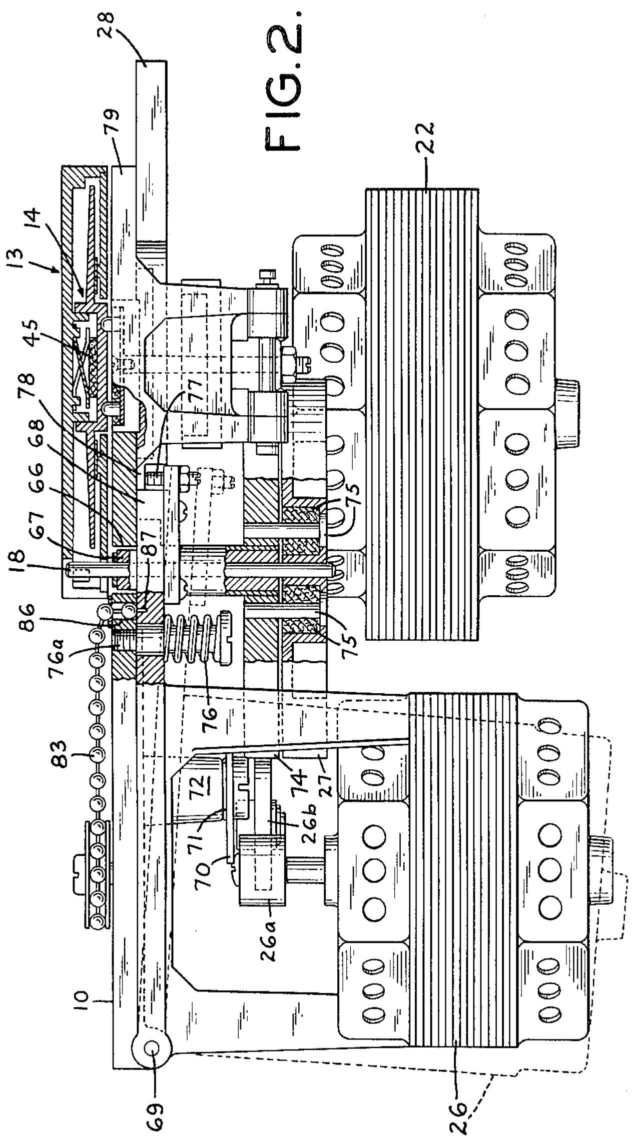
FIG. 2 is a left side view of the apparatus shown in FIG. 1.

The tape in the cartridge 13 is adapted to be transported past the reproducing head 16 at a speed of one and seven-eighths inches per second by a capstan 18 engaging a pressure roller 17. As best shown in FIG. 2, the capstan 18 extends through an opening 66 in the deck 10 and is rotatably secured in a bushing member 67 secured to a supporting member or plate 68 which is pivotally mounted on the deck 10 by hinge means 69. The plate member 68 also carries the drive motor 26, the drive roller **26*a* of which is adapted to drive the idler roller 26*b*. The idler roller 26*b* is rotatably secured on a plate 70 (FIG. 1) having a slot 71 therein which is slidably secured on a post 72 and which is normally biased by a spring 73 in the direction to maintain the idler 26*b* continuously engaged with the motor drive roller 26*a* and a filter disc 74. The mechanical filter disc 74 is coupled to the flywheel 27 through the usual pin and felt coupling 75**.

Normally, the plate member 68 (FIG. 2) which carries the motor 26 and the capstan 18 is maintained in the upward position by means of a compression spring 76 on a post **76*a* which extends through the plate member 68 and is secured to the deck 10. Lowering of the plate member 68 to bring the capstan 18 below the level of tape transport path is accomplished by a cam follower 77 secured on the plate member 68 which is adapted to ride on a cam surface 78 formed on the underside of a hub 79 to which the control bar 28** is secured.

As best shown in FIG. 1, the cam surface 78 is so shaped that when the bar 28 is in the "Neutral" or "Rewind" positions, the cam follower 77 is pushed downwardly to the position shown in dotted lines in FIG. 2 which would bring the capstan 18 below the level of the tape transport path. However, when the control bar 28 is moved to the "Play" position, the cam follower 77 rides up the cam surface 78 to return the plate member 68 and the capstan 18 to their normal positions.

The pressure roller 17 (FIG. 1) is mounted on a lever arm 80 which is pivotally mounted at 81 for rotation towards and away from the capstan 18. Normally, the pressure roller 17 is urged into engagement with the capstan 18 by a tension spring 82, but the lever arm 80 is connected by a flexible link 83 which passes over guides 84 and 85 and through an opening 86 in the deck 10 to the plate member 68 at 87. With this construction, when the control bar 28 is moved to either the "Neutral" or the "Rewind" positions in FIG. 1, the cam surface 78 on the hub 79 depresses the cam follower 77 and the plate member 68, applying tension to the flexible link 83 to move the pressure roller 17 away from the capstan 18 as the latter is moved to a level below the deck 10.

Figure 3:
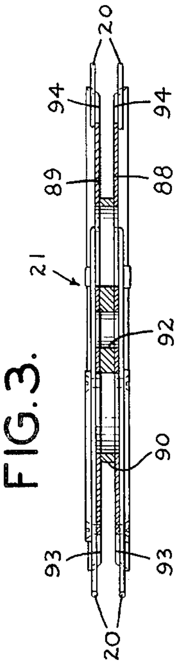
FIG. 3 is a side view of a takeup spool for the apparatus shown in FIG. 1.

During a reproducing operation, the tape unwound from the cartridge 13 is adapted to be wound on the takeup spool 21. The takeup spool 21 (FIGS. 1 and 3) comprises a pair of parallel flanges 88 and 89 secured on opposite sides of a hub 90 on which the tape is adapted to be wound. A driven element 91 (FIG. 4) of the slip clutch 25 extends through a central aperture 92 in the spool 21 and is secured to the latter by a screw **92*a***.

In order to provide for automatic takeup of the tape from the cartridge 13, the opposite faces 88 and 89 of the spool 21 are provided with opposed groove slots 93 and 94 which extend spirally inwardly to shallow recesses 95 and 96 formed in the hub 90. Also, pairs of parallel curved springs 20 are secured to the outside faces of the spool sides 88 and 89 and extend beyond the outer periphery of the spool in the vicinity of the slots 93 and 94.

With this structure, it will be apparent that as the spool 21 rotates in the counterclockwise direction in FIG. 1, the springs 20 will grasp the pull member 19 on the end of the tape and pull the latter from the cartridge 13. As rotation of the spool 21 continues in the counterclockwise direction, the pull member 19 will slide inwardly down the springs 20 and along the slot 93 until it reaches the recess 95 in the hub 90. As rotation continues, the tape from the cartridge 13 will be wound on the spool 21.

As indicated above, the spool 21 is adapted to be rotated in the counterclockwise direction to take up the tape from the cartridge 13 when the control bar 28 is in the "Play" position. To this end, the takeup and rewind motor 22 is pivotally mounted on the deck 10 at 97 (FIGS. 1 and 4) and is connected by a link 98 to a fixed point 99 on the hub 79 so that when the control arm 28 is moved to the "Play" position, the motor 22 is swung about its pivot 97 to bring the motor drive shaft 23 into engagement with the idler 24 which then drives the spool 21 through the slip clutch 25.

It will be noted that when the control bar 28 is moved to the "Neutral" position (FIG. 1), the motor 22 will be swung about its pivot 97 to move the motor drive shaft 23 out of engagement with the takeup idler 24.

After a reproducing operation has been completed and the tape is almost all wound on the takeup spool 21, it may be rewound on the spool 14 in the cartridge 13 by moving the control bar 28 to the "Rewind" position. This causes a cam surface 100 (FIGS. 1 and 4) on the hub 79 to release a cam follower 101 carried by a lever arm 102. The lever arm 102 is pivoted at 103 on a downwardly depending bracket 104 secured below the deck 10. The cam follower 101 is maintained continuously engaged with the cam surface 100 by a spring 105, one end of which is secured to the arm 102 and the other end of which is secured to a member 106 mounted on the underside of the deck 10.

The free end of the lever arm 102 carries a rotatable shaft 107 on which is secured a drive pulley 108 which engages the rewind idler 30. The upper end of the shaft 107 passes through a central bushing 109 in the hub 79 and carries at its upper end a disc-like member 110 on which are formed a pair of detents 111 which are adapted to be received within cooperating recesses formed in the underside of the cartridge spool 14.

The movement of the control bar 28 to the "Rewind" position also causes the rewind and takeup motor 22 to rotate about the pivot point 97 to bring the drive roller 29 thereon into engagement with the idler 30 so that the shaft 107 is caused to rotate and drives the spool 14 (FIG. 1) in the proper direction to rewind the tape.

In a typical operation, assume that there is no cartridge in position on the deck 10; that the control bar 28 is in the "Neutral" position; and that both the motors 22 and 26 are energized by suitable electrical circuits (not shown). The capstan 18 is now below the level of the tape transport path and the pressure roller 17 is in its disengaged position. To play a selection recorded on a tape in a cartridge 13, the cartridge is slipped between the guides 11 and 12 until it is in the position shown in FIG. 1. In this position, the tape passes under the guides 55 and 56 on the reproducing head 16 and lies between the capstan 18 and the pressure roller 17.

The control bar 28 is now moved to the "Play" position. This releases the plate member 68 (FIG. 2) which carries the capstan 18 and the motor 26 so that the capstan rises to its normal position. Simultaneously, the flexible link 83 is released, allowing the spring 82 (FIG. 1) to force the pressure roller 17 into engagement with the capstan 18, the tape being between the two.

At this time, the drive shaft 23 (FIG. 4) of the motor 22 is in engagement with the idler 24 so that the takeup spool 21 is driven through the slip clutch 25. As soon as one of the pairs of guide springs 20 on the takeup spool 21 arrives at the position of the pull member 19 (FIG. 1), it grasps the latter and guides it along the slot 93 to the recess 95 whereupon the tape is wound on the hub 90 in the conventional manner. The tape induces electric signals in the reproducing head 16 which may be fed to an amplifier and speakers (not shown).

After the selection recorded on the tape has been played and almost all of the tape is wound on the spool 21, the control bar 28 is moved the "Rewind" position. This depreses the plate member 68 (FIG. 2) which carries the capstan 18 and the motor 26 so that the capstan now lies below the level of the tape transport path. Lowering of the plate member 68 applies tension to the flexible link 83 and simultaneously draws the pressure roller 17 out of the tape transport path.

Simultaneously, the motor 22 is pivoted about its axis 97 (FIG. 4) to bring the drive roller 29 into engagement with the idler 30 while the lever arm 102 is raised to bring the detents 111 on the disc 110 into driving relation to the recesses 51 in the bottom of the spool hub portion 36. The spool now is driven in the rewind direction and, when it is entirely rewound, the brake comprising the pad 45 and the spring 46 functions as a slip clutch so that the tape will not be broken when the pull member 19 reaches the recess 64.

The control bar 28 is then restored to the "Neutral" position to disengage the motor 22 from both the rewind idler 30 and the takeup idler 24. However, the capstan 18 and the pressure roller 17 remain in the same position so that the cartridge 13 may be removed and another cartridge inserted for play or the apparatus may be shut down.

The invention thus provides novel and highly effective tape recording and reproducing apparatus which enables semiautomatic operation to be readily achieved. By virtue of the novel cartridge and takeup spool structure employed, the tape may be automatically threaded on the spool and unwound therefrom in a rewind operation with minimum attention on the part of the operator. Further, the space occupied by the spool of tape is much less than in conventional equipment so that the tape is competitive with disc records.

The specific embodiment described herein and illustrated in the drawings is intended to be merely exemplary and numerous modifications in form and detail are possible within the scope of the following claims.

We claim:

1. In magnetic tape recording and reproducing apparatus, the combination of a deck, means on said deck defining a tape cartridge receiving area, a magnetic head on said deck at one end of said area, a support pivotally mounted on said deck and carrying a rotatably mounted capstan and motive means therefor, said support being movable from a raised position to a lowered position to move said capstan means from a tape transport position to a position therebelow, pressure roller means movably mounted on said deck and normally urged towards said capstain means, means linking said pressure roller means to said support to move said pressure roller means away from said capstan means when said support is lowered, takeup spool means rotatably mounted on said deck, slip clutch means having a driven element and a driving element connected to said takeup spool means, normally disengaged supply spool rewind means movable to an engaged position to drive a supply spool in said supply spool area, second motive means movably mounted on said deck and adjustable to drive selectively said slip clutch means movable element and said supply spool rewind means, manually operable control means adjustable to a plurality of operating positions, means rendered operative with said control means in a first position for lowering said support and simultaneously moving said pressure roller means away from said capstan means, means rendered operative with said control means in a second position for raising said support to cause engagement of said pressure roller means and said capstan means and for moving said second motive means to drive said slip clutch means driven element, and means rendered operative with said control means in a third position for lowering said support, for moving said second motive means to drive said supply spool rewind means and for engaging said supply spool rewind means with a supply spool to rewind the same.

2. In a tape handling apparatus having a deck, a tape cartridge, guide means mounted on said deck for slidably receiving and positioning said tape cartridge on said deck, said tape cartridge having a box-like configuration supporting a supply of tape and having a first and a second recess formed in one end thereof, said cartridge having means at said one end defining a tape path along said one end past said recesses and out an opening positioned adjacent one corner of said cartridge, and transducer secured to said deck and aligned with said guide means to fit in said first recess when said cartridge is received by said guide means and to engage the exterior surface of the tape, the improvement comprising a take-up reel fixedly mounted on said deck adjacent said guide means for receiving said tape directed out said opening, a driven capstan, means supporting said capstan for vertical movement into and out of an operative position in said second recess wherein said capstan is engageable with the inner surface of the tape when said cartridge is received by said guide means, a pressure roller mounted on said deck for movement into and out of an operative position engaging the tap, means actuatable upon movement of said capstan supporting means for moving said pressure roller, and manually operable means joined with said capstan supporting means for effecting movement of said supporting means of said capstan in response to movement of said manually operable means.

3. In a tape handling apparatus having a deck, guide means mounted on said deck for slidably receiving and positioning a tape cartridge on said deck, said tape cartridge having a box-like configuration and being formed to rotatably support a hub member wound with a supply of tape, said cartridge being formed with a first and a second recess at one side thereof and being formed with means directing said tape along said one side past said recesses and out an opening positioned adjacent one corner of said cartridge, and a transducer secured to said deck in aligned relation with said guide means to fit in said first aperture when said cartridge is received by said guide means and to engage the exterior surface of the tape, the improvement comprising a take-up reel fixedly mounted on said deck adjacent said guide means for receiving said tape directed out said opening, a capstan, means supporting said capstan for vertical movement with respect to said deck and means for selectively moving said capstan supporting means to move said capstan into and out of an operative position in said second recess wherein said capstan is engageable with the inner surface of the tape when said cartridge is received by said guide means, a movably mounted pressure roller, and means actuatable upon movement of said capstan supporting means and said capstan toward operative position for moving said pressure roller toward said capstan in pressure contact with the exterior surface of said tape.

4. In a tape handling apparatus comprising a deck, guide means on said deck for positioning and slidably receiving a tape cartridge, a transducer secured to said deck and aligned with said guide means to engage the tape in a said cartridge and means defining a transport path for the tape in said cartridge past said transducer, the improvement comprising a driven capstan, a supporting member movably mounted below said deck for supporting said capstan and motive means therefore to afford vertical movement of the capstan with respect to said deck to place said capstan in an operative position with the tape transport path in a said cartridge and an inoperative position below said path permitting insertion and removal of a said cartridge radially with respect to the axis of said capstan along said guide means, a pressure roller mounted on said deck, means urging said pressure roller toward said capstan, means linking said pressure roller to said supporting member to move said roller away from said tape path upon movement of said capstan to said inoperative position, and a single manually operable control bar for moving said supporting member to move said capstan from said operative position to said inoperative position and for simultaneously moving said pressure roller away from said capstan and for maintaining said pressure roller in said position away from said capstan whenever said capstan is in said lowered position.

5. A tape handling apparatus adapted for use with a tape cartridge having a box-like configuration and being formed to support a supply of tape and having means defining a tape transport path along one edge of said cartridge, said apparatus comprising a deck, guide means mounted on said deck for receiving and positioning a said tape cartridge, a supporting plate mounted for movement to positions toward and away from said deck, a rotatable capstan and drive motor therefor carried by and movable with said supporting plate to place said capstan in an operative position adjacent the tape transport path of a said cartridge when said supporting plate is moved to the position toward said deck and to place said capstan in an inoperative position when said supporting plate is moved to the position away from said deck, pressure roller means mounted for movement toward and away from said capstan, means linking said pressure roller means to said supporting plate for moving said pressure roller means toward and away from said capstan when said supporting plate is moved respectively toward and away from said deck, and control means to afford said movement of said supporting plate.

References Cited by the Examiner

UNITED STATES PATENTS

| | | | |
|---|---|---|---|
| 2,680,613 | 6/1954 | Williams | 226—102 |
| 2,894,700 | 7/1959 | Roberts et al. | 242—55.13 |
| 2,996,229 | 8/1961 | Loewe | 242—55.12 |
| 3,023,943 | 3/1962 | Schober | 226—181 |
| 3,080,101 | 3/1963 | Kreithen et al. | 242—55.13 X |

MERVIN STEIN, *Primary Examiner.*